(12) United States Patent
Mainini et al.

(10) Patent No.: US 10,785,554 B2
(45) Date of Patent: Sep. 22, 2020

(54) MULTI-CABLE POSITIONING DEVICE AND HEADSET WITH SUCH DEVICE

(71) Applicant: Plantronics, Inc., Santa Cruz, CA (US)

(72) Inventors: Matthew J Mainini, Santa Cruz, CA (US); Manoj K Mistry, Santa Cruz, CA (US)

(73) Assignee: Plantronics, Inc., Santa Cruz, CA (US)

(*) Notice: Subject to any disclaimer, the term of this patent is extended or adjusted under 35 U.S.C. 154(b) by 0 days.

(21) Appl. No.: 16/265,728

(22) Filed: Feb. 1, 2019

(65) Prior Publication Data
US 2020/0252714 A1    Aug. 6, 2020

(51) Int. Cl.
| | |
|---|---|
| *H04R 1/10* | (2006.01) |
| *F16L 3/06* | (2006.01) |
| *A45F 5/02* | (2006.01) |
| *F16L 3/13* | (2006.01) |
| *F16L 3/133* | (2006.01) |
| *A41D 1/00* | (2018.01) |

(52) U.S. Cl.
CPC .............. *H04R 1/1033* (2013.01); *A45F 5/02* (2013.01); *F16L 3/06* (2013.01); *F16L 3/13* (2013.01); *F16L 3/133* (2013.01); *A41D 1/002* (2013.01); *A45F 2005/023* (2013.01); *B65H 2701/3919* (2013.01)

(58) Field of Classification Search
CPC ....... F16L 3/02; F16L 3/04; F16L 3/06; F16L 3/08; F16L 3/13; F16L 3/133; F16L 3/137; H04R 1/1033; H04R 1/1091; H04R 2201/023; A45F 5/02; A45F 2005/023; A41D 1/002; A41D 1/005; H04M 1/15; B65H 2701/3919

USPC ............................................ 381/374, 385, 395
See application file for complete search history.

(56) References Cited

U.S. PATENT DOCUMENTS

| | | | |
|---|---|---|---|
| 292,412 | A | 1/1884 | Covell |
| 2,506,783 | A | 5/1950 | Fauteux |
| 3,780,402 | A | 12/1973 | Takabayashi |
| 4,707,906 | A | 11/1987 | Posey |
| 5,129,126 | A | 7/1992 | Huang |
| 5,666,702 | A | 9/1997 | Ming-Chieh |
| 6,283,348 | B1 | 9/2001 | Wang |
| D477,029 | S * | 7/2003 | Korowitz ........................ D19/65 |

(Continued)

FOREIGN PATENT DOCUMENTS

WO    WO-2009/082325 A1    7/2009

OTHER PUBLICATIONS

Unknown, "Come together: New laser technique binds aluminum with plastic in injection molding", American Institute of Physics, Aug. 28, 2018, pp. 1-2, found at URL: https://phys.org/news/2018-08-laser-technique-aluminum-plastic-molding.html.

*Primary Examiner* — Jesse A Elbin
(74) *Attorney, Agent, or Firm* — Thomas S. Dienwiebel; Slayden Grubert Beard PLLC (57) ABSTRACT

The present disclosure concerns a multi-cable positioning device and a headset with multi-cable positioning device. The device comprises at least a fastening portion for removable attachment to clothing, and a cable management portion. The cable management portion comprises at least a first cable receptacle for a first cable, and a second cable receptacle for a second cable, wherein the cable receptacles are adapted for rotational and translational locking of the cables to increase comfort and stability.

18 Claims, 4 Drawing Sheets

(56) References Cited

U.S. PATENT DOCUMENTS

| | | | |
|---|---|---|---|
| 6,804,866 B2 | 10/2004 | Lemke et al. | |
| D594,225 S | 6/2009 | Leung et al. | |
| 7,699,198 B2 | 4/2010 | Sirichai et al. | |
| 7,778,435 B2 * | 8/2010 | Smith | H04R 1/10 181/135 |
| 8,381,359 B1 | 2/2013 | McArdle | |
| D682,256 S | 5/2013 | Murchison et al. | |
| D685,343 S | 7/2013 | Fletcher et al. | |
| 8,777,170 B2 | 7/2014 | Gilbert et al. | |
| 8,948,824 B2 | 2/2015 | Filson et al. | |
| D742,354 S | 11/2015 | McNamara et al. | |
| 9,232,826 B2 | 1/2016 | Vermillion | |
| 9,414,146 B2 * | 8/2016 | Sumsion | H04B 1/086 |
| 2003/0229971 A1 | 12/2003 | Coyne | |
| 2004/0155079 A1 | 8/2004 | Shetler et al. | |
| 2006/0283898 A1 | 12/2006 | Tages | |
| 2007/0095991 A1 | 5/2007 | Fall | |
| 2010/0170066 A1 * | 7/2010 | Honeycutt | H04R 5/0335 24/390 |
| 2010/0254123 A1 | 10/2010 | Brown | |
| 2011/0139950 A1 | 6/2011 | Wai et al. | |
| 2013/0048341 A1 * | 2/2013 | Walder | H04M 1/15 174/135 |
| 2015/0163580 A1 * | 6/2015 | Wallaja | H04R 1/1033 381/384 |
| 2015/0330478 A1 * | 11/2015 | Grewal | H04R 1/1033 381/384 |
| 2016/0157005 A1 * | 6/2016 | Green | H04R 1/1033 381/385 |
| 2019/0029404 A1 | 1/2019 | Mainini et al. | |

* cited by examiner

MULTI-CABLE POSITIONING DEVICE AND HEADSET WITH SUCH DEVICE

FIELD

The present disclosure relates generally to the field of cable management for mobile devices, in particular for audio devices, like headphones and headsets.

BACKGROUND

This background section is provided for the purpose of generally describing the context of the disclosure. Work of the presently named inventors, to the extent the work is described in this background section, as well as aspects of the description that may not otherwise qualify as prior art at the time of filing, are neither expressly nor implicitly admitted as prior art against the present disclosure.

Headphones and headsets—in the following commonly referred to as headsets—are ubiquitous around the world for a variety of applications, including mobile entertainment and mobile communications. Most of commercially available smart phones for example include an earbud-style headset that is usable for both, entertainment and communications.

A trend exists to provide headsets with an increased functionality. For example, active noise cancellation functionality is now included in a variety of headsets. Such added functionality generally adds weight to the headsets. Furthermore, many of today's headsets also include inline-arranged remote controls, sometimes with batteries and microphone units, all of which increase the weight of the overall device. Headsets for office environments generally have long cables to connect to various ports on multiple workstation setups, which is another factor for increased weight.

SUMMARY

The present inventors have ascertained that issues exist with cabled headsets and in particular with such that have significant cable weight. For example, office use cases may demand hand controls, active noise cancelling, excellent microphone performance, and in-ear wearing style. In those headsets, the weight may easily cause user discomfort and reduced stability. Accordingly, a need exists to increase comfort and stability in headsets.

The above need is met by a multi-cable positioning device and a headset with a multi-cable positioning device according to the independent claims. Embodiments are discussed in the dependent claims and the following description.

The invention proposes a multi-cable positioning device that allows to safely secure multiple cables, in particular such of a headset, to clothing. The multi-cable positioning device comprises a plurality of cable receptacles, which allow to receive and safely hold cables and which provide rotational and translational locking of the cables. The present invention thus allows to dissipate weight from the cables to the user's clothing, which would otherwise pull at the headphones and cause discomfort to the user. Simultaneously, the multi-cable positioning device provides rotational stability. The latter is beneficial, e.g., for access to an inline-arranged remote control or when using an inline-arranged microphone, since its orientation is stabilized.

In one aspect, a multi-cable positioning device is provided that comprises at least a fastening portion for removable attachment to clothing, and a cable management portion. The cable management portion comprises a first cable receptacle for a first cable, and a second cable receptacle for a second cable. The cable receptacles are configured for rotational and translational locking of the cables.

In another aspect, a headset is provided with a first and a second earphone, wherein a first cable extends from the first earphone and a second cable extends from the second earphone. The headset further comprises a multi-cable positioning device with at least a fastening portion for removable attachment to clothing, and a cable management portion; wherein the cable management portion comprises a first cable receptacle in which a portion of the first cable is arranged, and a second cable receptacle in which a portion of the second cable is arranged; wherein the cable receptacles are configured for rotational and translational locking of the cables.

The details of some embodiments are set forth in the accompanying drawings and the following description. Other features and embodiments will be apparent from the description, drawings, and from the claims.

DETAILED DESCRIPTION

Specific embodiments of the invention are described in detail herein. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In the context of this application, the term "headset" refers to all types of headsets, headphones, and other head worn audio playback devices, such as for example circumaural and supra-aural headphones, ear buds, in ear headphones, and other types of earphones. The headset may be of mono, stereo, or multichannel setup. A dedicated microphone for recording the user's voice may or may not be provided as part of a headset in the context of this application. The headset in some embodiments may comprise an audio processor. The audio processor may be of any suitable type to at least provide output audio from an input audio signal. For example, the audio processor may be a digital sound processor (DSP).

In the following description, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between like-named elements. For example, a first element is distinct from a second element, and the first element may encompass more than one element and succeed (or precede) the second element in an ordering of elements.

In one aspect, a multi-cable positioning device is provided, which at least comprises a fastening portion for removable attachment to clothing, and a cable management portion. The cable management portion according to this aspect comprises a first cable receptacle for a first cable, and a second cable receptacle for a second cable. The cable receptacles are configured for rotational and translational locking of the cables. Certainly, the multi-cable positioning device of this aspect may comprise further components in some embodiments.

The multi-cable positioning device, also referred to in the following simply as "positioning device", according to the present aspect may be of any suitable type and material. For example, the positioning device in some embodiments may be made of metal, fiberglass, polymeric material, plastic, and combinations thereof. In some embodiments, at least some components of the positioning device are made by injection molding.

The positioning device according to the present aspect comprises the fastening portion that allows a removable attachment of the positioning device to clothing. The fastening portion may be of any suitable type for attachment to clothing of a user. For example, the fastening portion may comprise a clip, such as designed similar or identical to a binder clip, hair clip, paper clip, crocodile clip, bread clip, money clip, a clamp, a clasp, pin, clothespin, safety pin, glue tab, hook-and-loop fastener, or other type of fastener.

The positioning device of the present aspect further comprises the cable management portion, comprising at least the first cable receptacle and the second cable receptacle. Certainly, the positioning device in some embodiments may comprise more than two cable receptacles. Each cable receptacle is configured to receive a cable in a way that provides rotational and translational locking of the respectively received cable.

In the context of the present discussion, the term "rotational locking" is understood as restricting rotational movement of a cable, i.e., around the longitudinal (cable) axis. The term "translational locking" is understood as restricting linear movement of the cable along the longitudinal axis.

As will be apparent from the preceding, the receptacles are configured to provide both, i.e., rotational and translational restriction of movement of a cable, received in the respective receptacle. The positioning device thus may be characterized as a "all in one" designed accessory, namely to position a microphone or inline controller if present, manage cables, and reduce a weight burden on the user's ears.

It is noted, that certainly, some movement of the cable while in the receptacle may be possible, for example a small rotational or linear movement may be acceptable. Similarly, some movement may be possible and acceptable when relatively high forces are applied to cable and/or the positioning device, e.g., when a user intends to adjust the positioning of the device relative to the cable, referred to in the following as "user adjustment force".

In some embodiments, at least one cable receptacle is adapted to exert a clamping force on a cable, received therein. For example, the cable receptacle may provide a sufficient elasticity to exert a clamping force to a received cable and thus to securely hold and lock the cable in place. Alternatively, the cable receptacle may comprise a spring-loaded clamping member, which exerts the clamping force.

In further embodiments, at least one cable receptacle is adapted to receive a single cable, i.e., a single cable only. The present embodiment provides a particularly safe locking of the cable with the receptacle.

According to some embodiments, the cable receptacles are arranged spaced from each other. A separated arrangement of the receptacles improves the locking further and also may improve interference characteristics.

In further embodiments, at least one cable receptacle is formed as a cable clamp. In this context, the term "cable clamp" includes the various known types of cable clips and cable clamps. In some embodiments, at least one cable clamp is formed for receiving a flat cable. The cable clamp in these embodiments, e.g., may be formed with a corresponding flat cut-out, so as to provide the aforementioned rotational locking. In some embodiments, the cable receptacles are formed as c-shaped cable clamps.

In some embodiments, the positioning device comprises at least a first and a second device arm, wherein each device arm comprises a fastening end and a cable end. In some embodiments, the fastening end of each device arm is arranged opposite to the cable end along the longitudinal axis of the respective device arm. In some embodiments, the fastening ends of the two device arms are arranged adjacent to each other to form the fastening portion and the cable ends of the two device arms are arranged adjacent to each other to form the cable management portion. In some embodiments, the device arms are elongated device arms.

The at least two device arms of the present embodiments may be made of any suitable material or combination of materials. For example, the device arms may be made from metal, fiberglass, polymeric material, plastic, and combinations thereof. Each arm may be a one-piece component or a multi-piece component, where the respective components are attached to each other by any suitable connection. While the two device arms in some embodiments are elongated in shape, i.e., longer in one dimension compared to the other dimensions, it is noted that the device arms may be curved or comprise sections, which are arranged at an angle to each other.

According to further embodiments, the first device arm and the second device arm are arranged in a common plane. In some embodiments, the first device arm and the second device arm are arranged substantially parallel to each other.

In some embodiments, the two device arms are pivotally connected with each other about an axis of rotation. In some embodiments, the axis of rotation is perpendicular to the common plane.

According to some embodiments, the positioning device further comprises a spring, which exerts a force onto the device arms towards a closed position of the fastening portion, i.e., where the fastening ends of the at least two device arms touch each other or clamp to, for example, clothing.

In some embodiments, the cable end of the first device arm forms the first cable receptacle. Alternatively or additionally and in corresponding embodiments, the cable end of the second device arm forms the second cable receptacle. As discussed in the preceding, the cable receptacles may be formed as cable clamps. Accordingly, the respective cable ends of the device arms may be formed as cable clamps.

According to further embodiments, the cable end of at least one device arm comprises a clamp protrusion, which clamp protrusion extends from a base section of the respective cable end to form the respective cable receptacle. Certainly, and in additional embodiments, both device arms may comprise respective (first and second) clamp protrusions, which form, together with the (first and second) base sections of the respective device arm, the first and second cable receptacle, respectively.

The base section may generally be aligned with the longitudinal axis of the respective device arm. Certainly, this may not necessarily be the case, e.g., when the device arm is curved or when it has angled sections. The clamp protrusion may, e.g., be formed so that its longitudinal axis is at least substantially parallel to the base section of the cable end.

In some embodiments, the clamp protrusion extends from the base section to form a generally c-shaped cable receptacle, i.e. a corresponding void. The c-shaped receptacle may be adapted to receive a cable.

According to further embodiments, the c-shaped receptacle defines a receptacle diameter, which in the present context is understood as the diameter of the void, where a cable can be received and subsequently locked in place. It is noted, that the term diameter is used, although the void of the receptacle may be more rectangular in shape. In this case, the diameter is understood as the longest linear dimension of the void.

In further embodiments, the c-shaped cable receptacle further comprises an opening to receive a cable, which opening has a width that is less than the receptacle diameter. The present embodiments provide a "self-locking" feature in that due to the smaller width of the opening, an accidental disconnection of a received cable from the respective cable can be avoided.

In some embodiments, the clamp protrusion may be formed at least in part of an elastic material. This allows the clamp protrusion to exert a clamping force to a cable, received in the cable receptacle and thus to securely hold and lock the cable in place.

According to further embodiments, the clamp protrusion is arranged on a side of the base section, facing the respective other device arm. In the present embodiments, the clamp protrusion is arranged inwardly, i.e., facing the respective other device arm, which results in a compact setup and is more comfortable to the user when, e.g., attaching or detaching the positioning device to and from clothing.

According to another aspect, a headset with a first and a second earphone is provided. According to this aspect, a first cable extends from the first earphone and a second cable extends from the second earphone. The headset further comprises a multi-cable positioning device with at least a fastening portion for removable attachment to clothing, and a cable management portion; wherein the cable management portion comprises at least first cable receptacle in which a portion of the first cable is arranged, and a second cable receptacle in which a portion of the second cable is arranged; wherein the cable receptacles are configured for rotational and translational locking of the cables.

The headset according to the present aspect and in further embodiments may be configured according to one or more of the embodiments, discussed in the preceding with reference to the preceding aspect. With respect to the terms used for the description of the present aspect and their definitions, reference is made to the discussion of the preceding aspect.

According to another aspect, a multi-cable positioning device is provided with at least a first device arm; and a second device arm; wherein each device arm comprises a fastening end and a cable end; the fastening ends are arranged adjacent to each other to form a fastening portion for removable attachment to clothing; the cable end of the first arm comprises a first cable receptacle; the cable end of the second arm comprises a second cable receptacle; and wherein each cable receptacle is adapted for rotational and translational locking of a cable.

The multi-cable positioning device according to the present aspect and in further embodiments may be configured according to one or more of the embodiments, discussed in the preceding with reference to the preceding aspects. With respect to the terms used for the description of the present aspect and their definitions, reference is made to the discussion of the preceding aspects.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate figures. It is further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

Figure 1A:
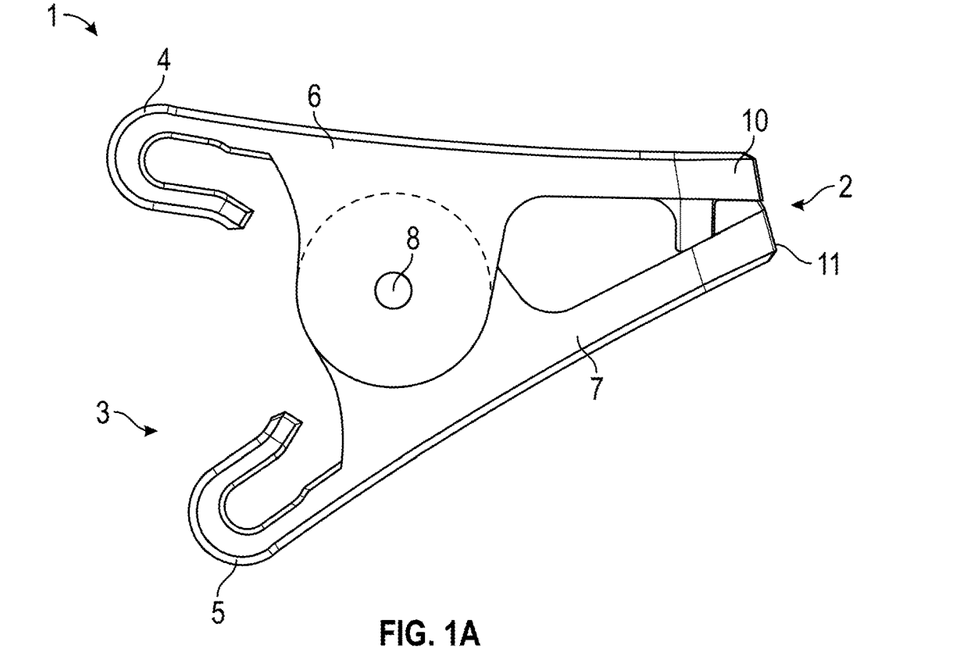
FIG. 1A shows a first embodiment of a multi-cable positioning device in a schematic side elevation view.

FIG. 1A shows a first embodiment of a multi-cable positioning device 1 in a schematic side elevation view. The device 1 comprises a fastening portion 2 and a cable management portion 3, wherein the fastening portion allows a removable attachment to clothing and the cable management portion 3 allows to lock two cables (see FIG. 1C), such as two cables of a headset, separately from each other. The device 1 comprises a first cable receptacle 4 and a second cable receptacle 5, which are generally of a c-shape and formed as cable clamps. Each cable receptacle 4, 5 is configured to receive a cable in a way that provides rotational and translational locking of the respectively received cable, so that the cables are at least during use securely held by the receptacles 4, 5.

The first cable receptacle 4 is formed on a cable end of a first device arm 6 and the second cable receptacle 5 is formed on a cable end of a second device arm 7. The device arms 6,7 further each comprises a fastening end 10, 11, which fastening ends 10, 11 are opposite to the cable ends along the longitudinal axis of the respective device arm 6, 7. The fastening ends 10, 11 in this embodiment each comprise a jaw-like bar to fasten the device 1 to clothing, etc. The bars are formed to engage with the respective other bar in an interlocking way.

Both device arms 6, 7 are pivotally connected with each other around axis of rotation 8. This allows the fastening portion 2 to open and close and thus to attach to clothing, etc. A spring (not shown) is provided to exert a force on the two device arms 6, 7 towards the closed position of the fastening portion 2, so that the fastening ends 10, 11 are pressured against each other.

The two cable receptacles 4, 5 are formed as c-shaped cable clamps, as discussed in the preceding, to prevent translational and rotational movement of received cables. This is in particular beneficial in case of headset cables. For example, in case of an in-line provided microphone, the microphone can be positioned as desired for sufficient sound quality and the positioning device 1, once securely attached to clothing, keeps the microphone safely in place, while simultaneously removing the weight of the cable assembly from the user's ears.

To allow proper clamping, the two cable receptacles 4, 5 are formed from an elastic material, i.e., one that provides a clamping force onto a received cable. In the present embodiment, the cable receptacles 4, 5 are formed integrally with the device arms 6, 7, which are made from PC 1414 material, i.e., a polycarbonate. Certainly, it is alternatively possible to form the device arms 6, 7 and the cable receptacles 4, 5 from different materials and then attach the cable receptacles 4, 5 to the device arms 6, 7 using a suitable fastening method (glue, molding techniques, fastener, etc.). In this case, the cable receptacles 4, 5 may be made from polycarbonate material, while the remaining sections of the device arms 6, 7 may be made from aluminum.

Figure 1B:
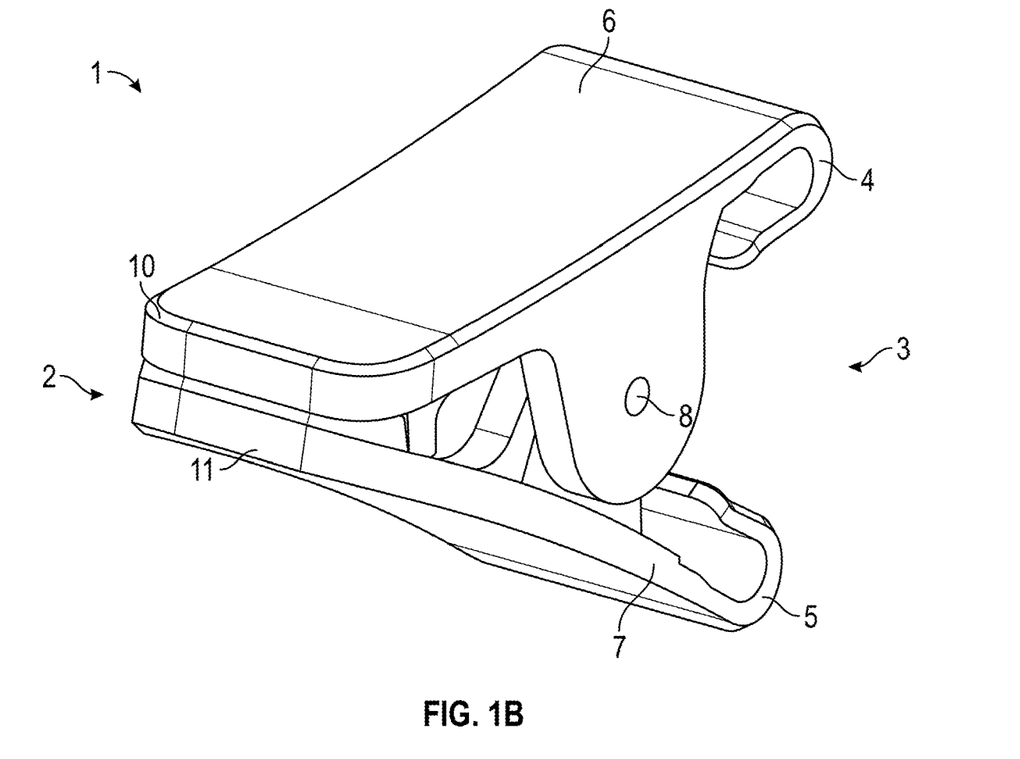
FIG. 1B shows the embodiment of FIG. 1A in a front perspective view.
Figure 1C:
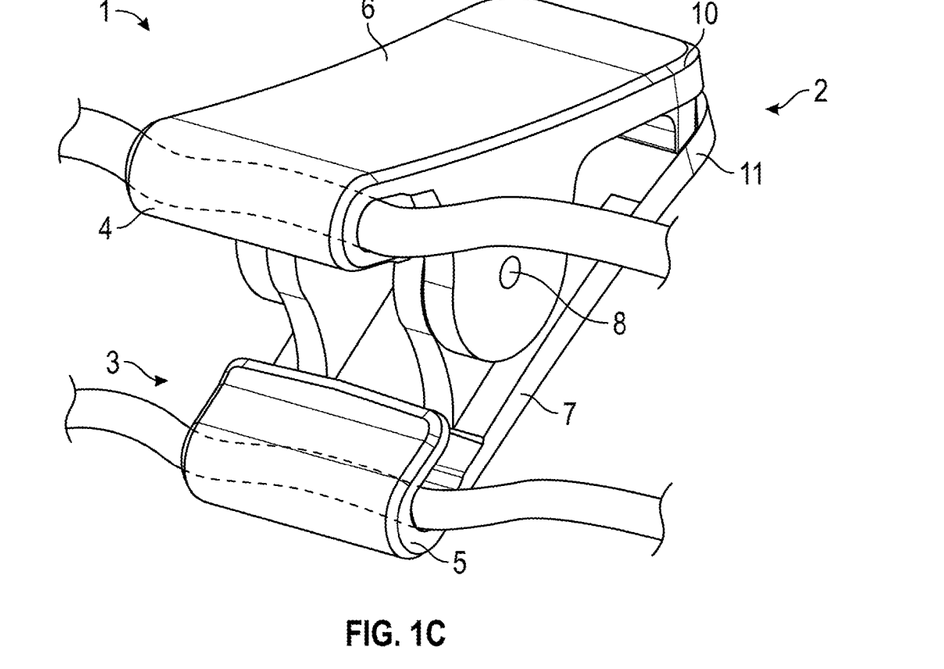
FIG. 1C shows the embodiment of FIG. 1A in a rear perspective view together with two cables, attached with the multi-cable positioning device.
Figure 1D:
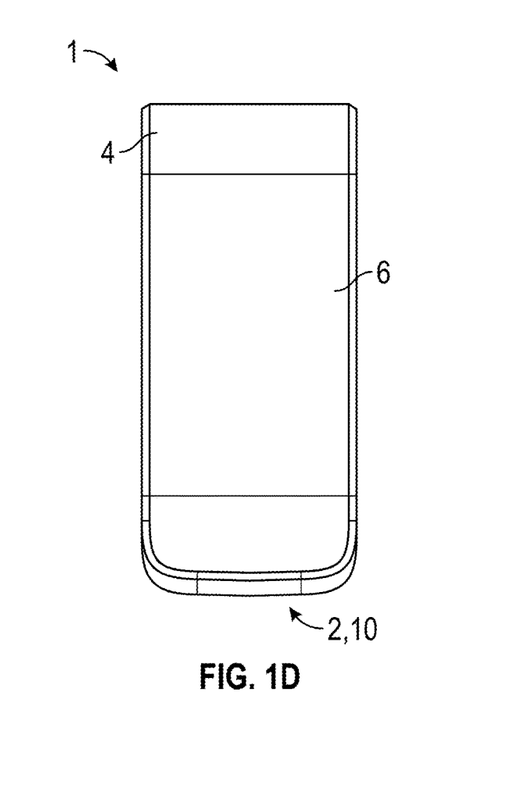
FIG. 1D shows the embodiment of FIG. 1A in a top elevation view.
Figure 1E:
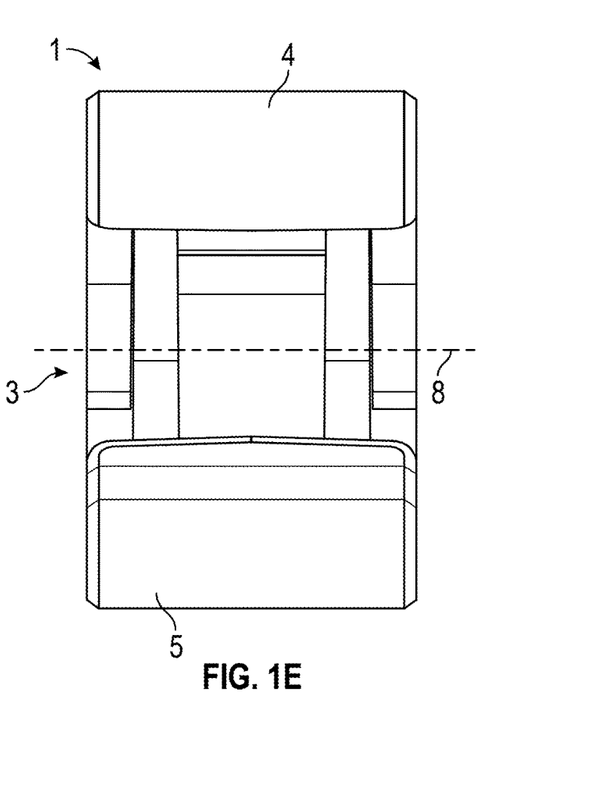
FIG. 1E shows the embodiment of FIG. 1A in a rear elevation view.

As can be best seen from FIGS. 1C and 1E, which show a rear perspective view and a rear elevation view, respectively, the cable receptacles 4, 5 are formed elongated over the entire width of the device arms 6, 7, which improves the cable clamping.

FIG. 1B shows the embodiment of FIG. 1A in a front perspective view. As can be seen from FIG. 1B, the jaw-like bars of fastening ends 10, 11 are formed over the entire width of the device arms 6, 7, i.e., corresponding to the cable receptacles 4, 5.

Figure 2A:
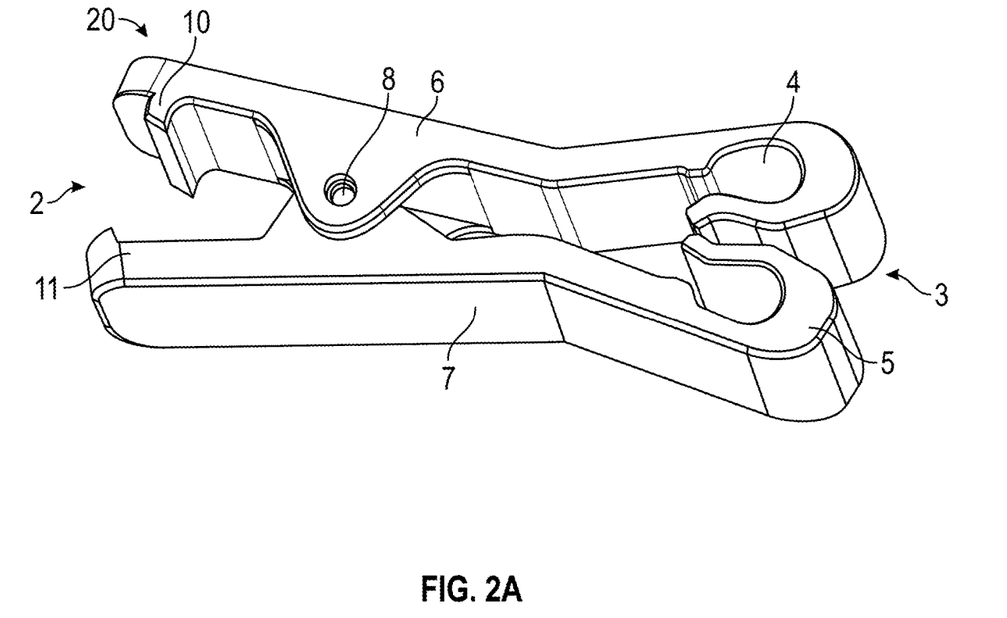
FIG. 2A shows another embodiment of a multi-cable positioning device in a schematic perspective view.
Figure 2B:
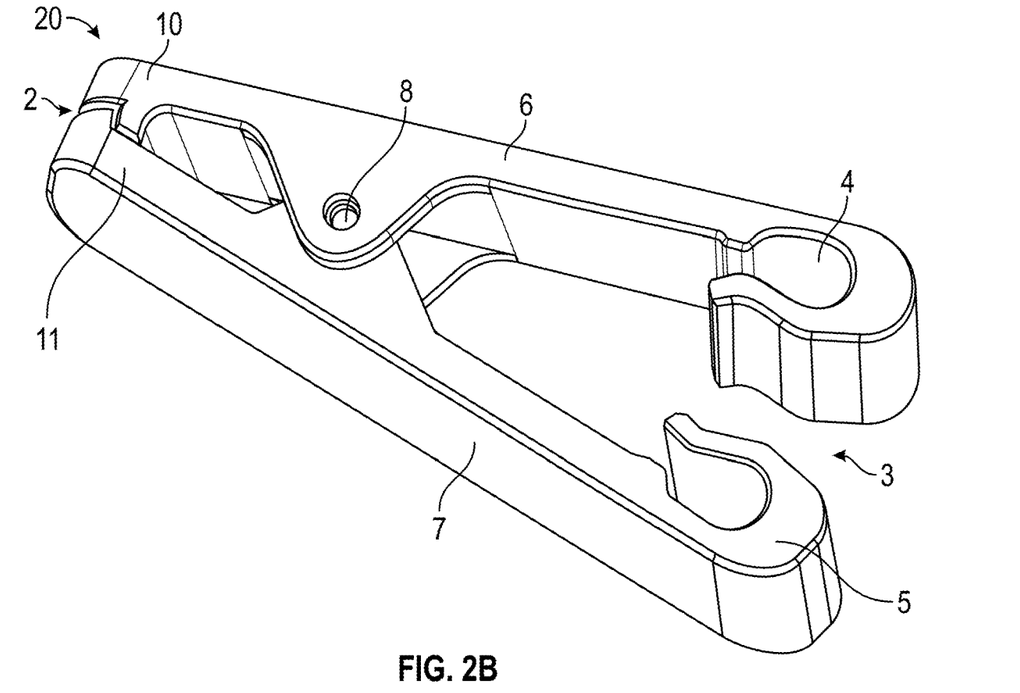
FIG. 2B shows the embodiment of FIG. 2A in a closed position.

FIGS. 2A-2B show another embodiment of a multi-cable positioning device 20 in a schematic perspective view. The multi-cable positioning device 20 of the present embodiment corresponds to the embodiment of FIGS. 1A-1E, with the following exceptions. As will be apparent from FIGS. 2A-2B, the two device arms 6, 7 of the present embodiment are somewhat longer, compared to the preceding embodiment, leading to a different aspect ratio of the device 20. In addition, the device arms 6, 7 comprise two sections, which are arranged at a slight angle to each other. This provides the device 20 with a generally x-shaped setup, which provides the user with more leverage when opening and closing the fastening portion 2. While FIG. 2A shows an open position of fastening portion 2, FIG. 2C shows the closed position, i.e., corresponding to the views of FIGS. 1A-1E.

Figure 3:
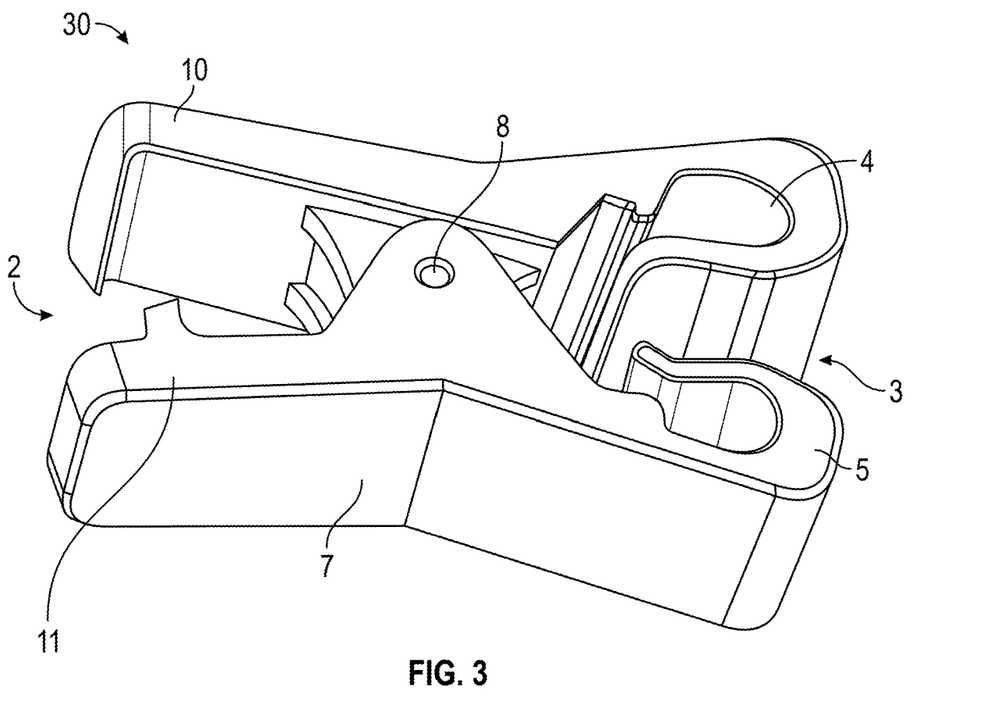
FIG. 3 shows another embodiment of a multi-cable positioning device in a schematic perspective view.

FIG. 3 shows another embodiment of a multi-cable positioning device 30 in a schematic perspective view. The device 30 corresponds to the device 20 of FIGS. 2A-2C, with the exception of a reduced length of device arms 6, 7, leading to an aspect ratio in line with FIGS. 1A-1E, however retaining the x-shaped design of FIGS. 2A-2B.

While the invention has been illustrated and described in detail in the drawings and foregoing description, such illustration and description are to be considered illustrative or exemplary and not restrictive; the invention is not limited to the disclosed embodiments. For example, it is possible to operate the invention in any of the preceding embodiments, wherein the cable receptacles 4, 5 being formed with a corresponding flat cut to receive a flat cable; and/or
the fastening portion 2, instead of being formed with jaw-like bars, the fastening portion 2 being formed corresponding to a binder clip, hair clip, paper clip, crocodile clip, bread clip, money clip, a clamp, pin, clothespin, safety pin, or having a glue tab and/or a hook-and-loop fastener.

The invention has been described in the preceding with reference to various embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfill the functions of several items recited in the claims.

The mere fact that certain measures are recited in mutually different dependent claims or different embodiments does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A multi-cable positioning device with at least
    a fastening portion for removable attachment to clothing, and
    a cable management portion; wherein
        the cable management portion comprises at least
            a first cable receptacle for a first cable, and
            a second cable receptacle for a second cable; wherein
            the cable receptacles are adapted for rotational and translational locking of the cables; the multi-cable positioning device further comprising a first and a second device arm, each comprising a fastening end and a cable end, wherein the fastening ends are arranged adjacent to each other to form the fastening portion and the cable ends are arranged adjacent to each other to form the cable management portion.

2. The multi-cable positioning device of claim 1, wherein the first and second cable receptacles are arranged spaced from each other.

3. The multi-cable positioning device of claim 1, wherein at least one of the first and second cable receptacles are formed as cable clamps.

4. The multi-cable positioning device of claim 1, wherein at least one cable receptacle is formed for receiving a flat cable.

5. The multi-cable positioning device of claim 1, wherein at least one cable receptacle is formed as a c-shaped cable clamp.

6. The multi-cable positioning device of claim 1, wherein the first device arm and the second device arm are pivotally connected with each other about an axis of rotation, which axis is oriented perpendicular to a plane in which the device arms are arranged.

7. The multi-cable positioning device of claim 6, further comprising a spring, which exerts a force onto the device arms towards a closed position of the fastening portion.

8. The multi-cable positioning device of claim 1, wherein the cable end of at least one device arm comprises a clamp protrusion, which clamp protrusion extends from a base section of the cable end to form the respective cable receptacle.

9. The multi-cable positioning device of claim 8, wherein the clamp protrusion extends from the base section to form a c-shaped cable receptacle.

10. The multi-cable positioning device of claim 9, wherein the c-shaped cable receptacle defines a receptacle diameter, wherein the c-shaped cable receptacle further comprises an opening to receive a cable, which opening has a width that is less than the receptacle diameter.

11. The multi-cable positioning device of claim 8, wherein the clamp protrusion is formed at least partly from elastic material.

12. The multi-cable positioning device of claim 8, wherein the clamp protrusion is arranged on a side of the base section, facing the respective other device arm.

13. The multi-cable positioning device of claim 8, wherein the cable ends of both device arms comprise respective clamp protrusions.

14. The multi-cable positioning device of claim 1, wherein the device is generally x-shaped.

15. The multi-cable positioning device of claim 1, wherein the cable receptacles are configured so that respective cable can be unlocked from the cable receptacle upon exertion of a user adjustment force.

16. A headset with a first and a second earphone, wherein a first cable extends from the first earphone and a second cable extends from the second earphone, and with a multi-cable positioning device with at least
a fastening portion for removable attachment to clothing, and
a cable management portion; wherein
the cable management portion comprises at least
a first cable receptacle in which a portion of the first cable is arranged, and
a second cable receptacle in which a portion of the second cable is arranged;
wherein the cable receptacles are configured for rotational and translational locking of the cables; the multi-cable positioning device further comprising a first and a second device arm, each comprising a fastening end and a cable end, wherein the fastening ends are arranged adjacent to each other to form the fastening portion and the cable ends are arranged adjacent to each other to form the cable management portion.

17. A multi-cable positioning device with at least
a first device arm; and
a second device arm; wherein
each device arm comprises a fastening end and a cable end;
the fastening ends are arranged adjacent to each other to form a fastening portion for removable attachment to clothing;
the cable end of the first arm comprises a first cable receptacle;
the cable end of the second arm comprises a second cable receptacle; and wherein
each cable receptacle is adapted for rotational and translational locking of a cable.

18. The multi-cable positioning device of claim 17, wherein each cable receptacle is formed as a cable clamp.

* * * * *